US009214653B2

(12) United States Patent
Sato

(10) Patent No.: US 9,214,653 B2
(45) Date of Patent: Dec. 15, 2015

(54) SECONDARY BATTERY COMPRISING TERMINAL INSULATING MEMBERS

(75) Inventor: Yutaka Sato, Hitachinaka (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 255 days.

(21) Appl. No.: 13/991,927

(22) PCT Filed: Dec. 9, 2010

(86) PCT No.: PCT/JP2010/072145
§ 371 (c)(1),
(2), (4) Date: Jun. 6, 2013

(87) PCT Pub. No.: WO2012/077216
PCT Pub. Date: Jun. 14, 2012

(65) Prior Publication Data
US 2013/0260190 A1    Oct. 3, 2013

(51) Int. Cl.
*H01M 2/02* (2006.01)
*H01M 2/06* (2006.01)
*H01M 2/20* (2006.01)
(Continued)

(52) U.S. Cl.
CPC ............... *H01M 2/024* (2013.01); *H01M 2/06* (2013.01); *H01M 2/1077* (2013.01); *H01M 2/12* (2013.01); *H01M 2/26* (2013.01); *H01M 2/305* (2013.01); *H01M 10/613* (2015.04); *H01M 10/625* (2015.04); *H01M 10/647* (2015.04); *H01M 10/658* (2015.04); *H01M 10/6553* (2015.04); *H01M 10/6555* (2015.04); *H01M 10/6557* (2015.04)

(58) Field of Classification Search
CPC ....... H01M 2/06; H01M 2/12; H01M 2/1077; H01M 2/305; H01M 2/024; H01M 2/26; H01M 10/5004; H01M 10/5016; H01M 10/5087
See application file for complete search history.

(56) References Cited

U.S. PATENT DOCUMENTS

2009/0195210 A1 * 8/2009 Takeuchi et al. .............. 320/134

FOREIGN PATENT DOCUMENTS

| JP | 2005-317324 A | 11/2005 |
|---|---|---|
| JP | 2009-181853 A | 8/2009 |

(Continued)

OTHER PUBLICATIONS

Machine Translation of: WO 2010/095224 A1, Awano et al., Aug. 26, 2010.*

(Continued)

*Primary Examiner* — Kenneth Douyette
(74) *Attorney, Agent, or Firm* — Volpe and Koenig, P.C.

(57) ABSTRACT

Terminal insulating members 7A, 7B have inner side surfaces of a first support base 71A facing each other, and an engaging recesses 75 extending along a surface of a cover 6 are formed in inner surfaces of both the terminal insulating members. An outer surface along a short side of the cover in a second support base 72A is formed with an engaging recess 76 extending along a cover surface. The engaging recesses 75 and 76 of both the terminal insulating members are arranged to face each other. Further, both the terminal insulating members are also provided with engaging recesses 77 having a substantially circular cross-sectional shape on both side surfaces along a long side of the cover. The configuration can be used for positioning or fixing an accessory loaded into a secondary battery SB. As a result, a part only for loading an external part is unnecessary.

8 Claims, 23 Drawing Sheets

(51) Int. Cl.
*H01M 2/12* (2006.01)
*H01M 2/10* (2006.01)
*H01M 2/30* (2006.01)
*H01M 2/26* (2006.01)
*H01M 10/625* (2014.01)
*H01M 10/6553* (2014.01)
*H01M 10/647* (2014.01)
*H01M 10/6557* (2014.01)
*H01M 10/6555* (2014.01)
*H01M 10/613* (2014.01)
*H01M 10/658* (2014.01)

(56) References Cited

FOREIGN PATENT DOCUMENTS

| | | |
|---|---|---|
| JP | 2010-049942 A | 3/2010 |
| JP | 2010-080352 A | 4/2010 |
| JP | 2010-113888 A | 5/2010 |
| WO | 2010/095224 A1 | 8/2010 |

OTHER PUBLICATIONS

Machine Translation of JP 2010/049942 A, Yoshitake et al., Mar. 4, 2010.*

* cited by examiner

SECONDARY BATTERY COMPRISING TERMINAL INSULATING MEMBERS

TECHNICAL FIELD

The present invention relates to a secondary battery including a terminal insulating member which isolates an external terminal from a metal container of the secondary battery.

BACKGROUND ART

The secondary battery represented by a lithium ion secondary battery used for a hybrid vehicle or an electric vehicle includes a safety valve that discharges a gas generated within the secondary battery.

For example, PTL 1 has proposed a structure in which a cover that totally covers safety valve outlets of a plurality of secondary batteries is provided to collect a gas even when the gas is discharged from any secondary battery.

PTL 2 has proposed a structure in which a connection part for connecting a gas collection part directly to a neighborhood of the safety valve formed on a contour portion of the secondary battery is provided.

CITATION LIST

Patent Literature

PTL 1: JP-A-2010-113888 (electric storage device and vehicle)
PTL 2: JP-A-2010-49942 (battery system)

SUMMARY OF INVENTION

Technical Problem

When the gas collection part is fitted, later as with the secondary batteries disclosed in PTL 1 and PTL 2, a fixing part for loading the later-fitted part into the secondary battery is necessary.

Solution to Problem

According to the present invention, there are provided a power generation body that is housed within a battery container sealed with a cover, positive and negative external terminals that are disposed on the cover and connected to the power generation body, and a pair of terminal insulating members that isolate the respective positive and negative external terminals from the cover, in which at least one of the pair of terminal insulating members is formed with a fitting portion for loading an external part into the battery container.

Advantageous Effects of Invention

According to the present invention, the number of parts can be reduced without need of a particular part only for loading when the external part is loaded into the secondary battery.

DESCRIPTION OF EMBODIMENTS

A secondary battery according to embodiments of the present invention will be described with reference to the drawings.

First Embodiment

Overall Battery Configuration

Figure 1:
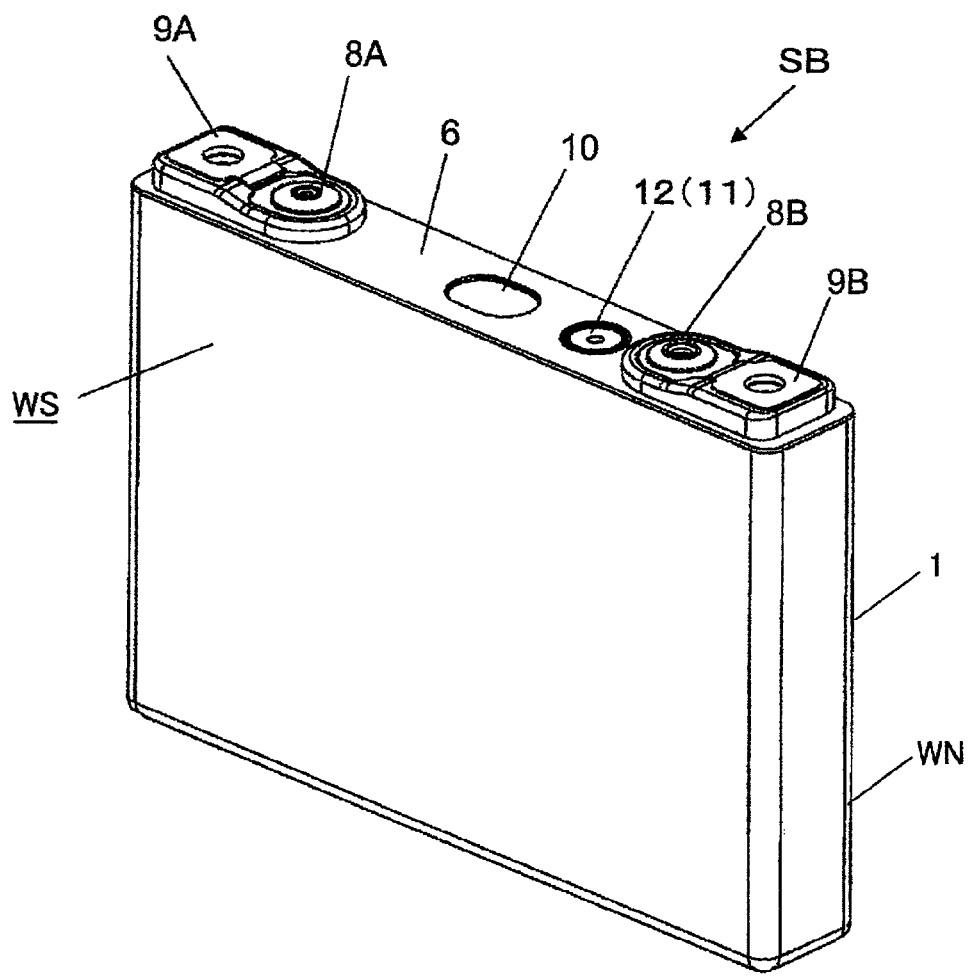
FIG. 1 is an external perspective view illustrating a secondary battery according to an embodiment of the present invention.

A secondary battery SB illustrated in FIG. 1 includes a case 1 and a cover 6 configuring a battery container. In the present specification, a front surface of the case 1 indicated by symbol WS is called "largest surface", and a side surface of the case 1 indicated by symbol WN is called "smallest surface". A lateral direction of the front surface of the case 1 is called "width of the battery", and a width of the side surface, that is, a depth direction of the battery is called "thickness of the battery".

A power generation body 3 (FIG. 2) is housed within the case 1, and the case 1 is sealed with the cover 6. The cover 6 is welded to the case 1 to configure the battery container. The cover 6 is provided with a positive external terminal 9A and a negative external terminal 9B. An electric power stored in the power generation body 3 is supplied to an external load through the positive and negative external terminals 9A and 9B, and an electric power generated by regenerative operation is charged into the power generation body 3 through the positive and negative external terminals 9A and 9B.

The cover 6 is integrated with a gas discharge valve 10. When a pressure within the battery container rises, the gas discharge valve 10 is opened to discharge a gas from an interior thereof, and the pressure within the battery container is reduced. As a result, the safety of the secondary battery SB is ensured.

The cover 6 is formed with an inlet 11 from which an electrolyte is poured into the case 1, and the inlet 11 is sealed with a filler plug 12 after the electrolyte has been poured thereinto.

Symbols 8A and 8B are caulking members for fixing the positive and negative external terminals 9A and 9B to the cover, which will be described in detail later.

Figure 2:
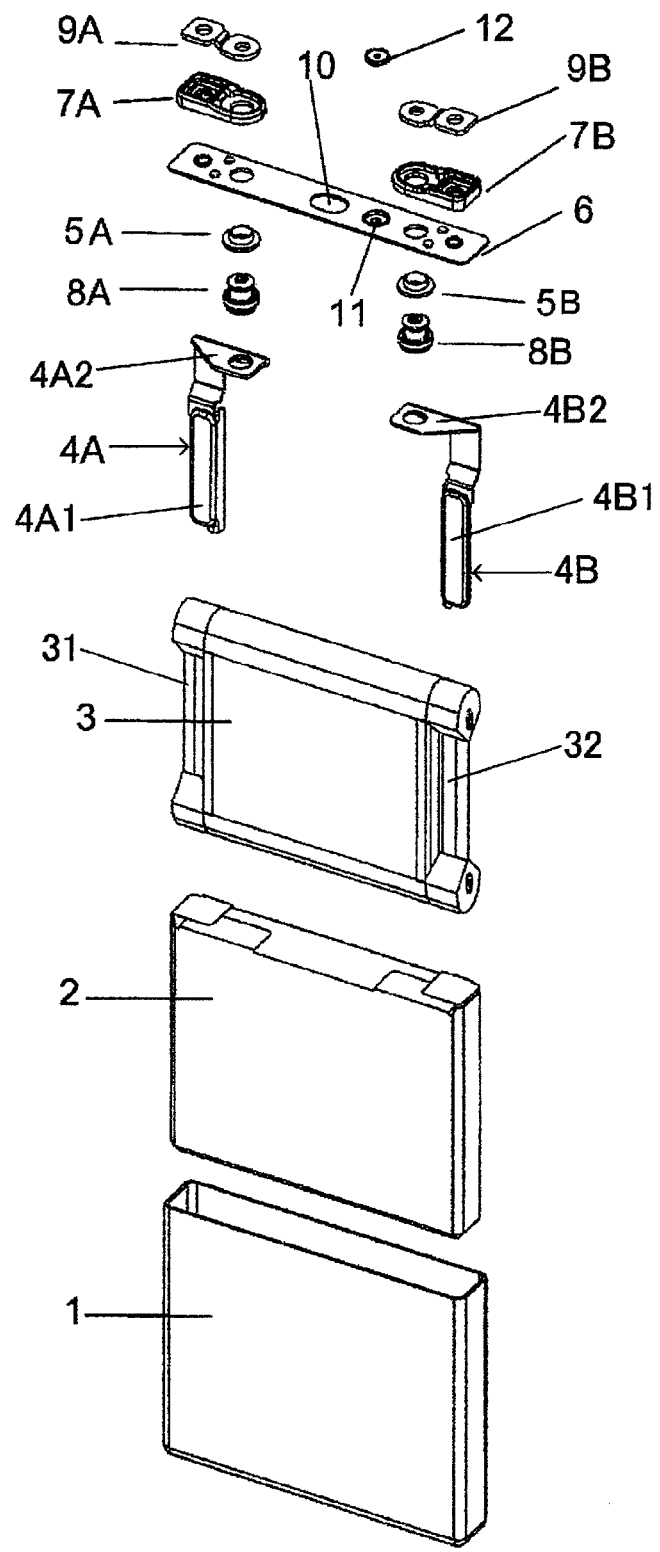
FIG. 2 is an exploded perspective view of the secondary battery in FIG. 1.

The secondary battery SB will be further described in detail with reference to FIG. 2 which is an exploded perspective view of the secondary battery SB.

The power generation body 3 is housed within the case 1 of the secondary battery SB through an insulating bag 2 made of an insulating material. The power generation body 3 is an electrode group in which positive and negative bodies are wound into a flat shape through a separator, and respective electrode foil exposed surfaces on which a cathode mix and an anode mix are not coated are formed on both end sides thereof in a winding axial direction as a positive connection portion 31 and a negative connection portion 32, and those positive and negative connection portions 31 and 32 are connected with one ends 4A1 and 4B1 of positive and negative current collectors 4A and 4B, respectively. Lower end portions of the positive and negative connection members (caulking members) 8A and 8B are caulked and fixed to the other ends 4A2 and 4B2 of the positive and negative current collectors 4A and 4B. Upper end portions of the positive and negative connection members 8A and 8B penetrate through the cover 6, and extend up to an upper surface of the battery. Terminal insulating members 7A, 7B, and the positive and negative external terminals 9A, 9B are stacked on an upper surface of the cover 6, respectively. The negative connection members 8A and 8B penetrate through the cover 6, the terminal insulating members 7A, 7B, and the positive and negative external terminals 9A, 9B, respectively, and protrude to the external of the battery case 1. On the upper surface of the cover 6, the positive and negative connection members 8A, 8B, and the positive and negative external terminals 9A and 9B are caulked and fixed to each other.

With the above configuration, the positive and negative external terminals 9A and 9B are electrically connected to the positive and negative current collectors 4A and 4B by the aid of the positive and negative connection members 8A and 8B. The positive and negative external terminals 9A and 9B are isolated from the cover 6 by the aid of the terminal insulating members 7A and 7B. The positive and negative connection members 8A and 8B are electrically isolated from the cover 6 by gaskets 5A and 5B.

The feature of the present invention resides in that a variety of accessories of the secondary battery SB can be loaded onto the cover 6, that is, the battery container with the use of the positive and negative terminal insulating members 7A and 7B. The accessories are exemplified by a gas collection duct, a radiation function member, and a cell holder in the following description.

Figure 3:
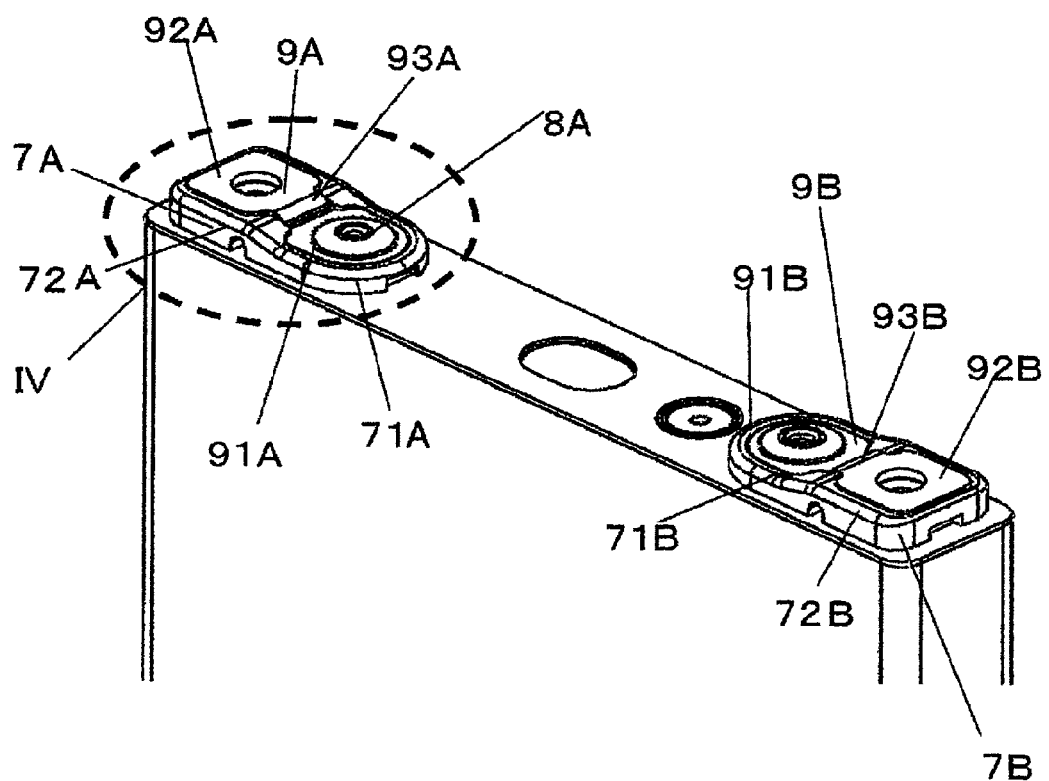
FIG. 3 is a partially enlarged view of the secondary battery in FIG. 1.
Figure 4:
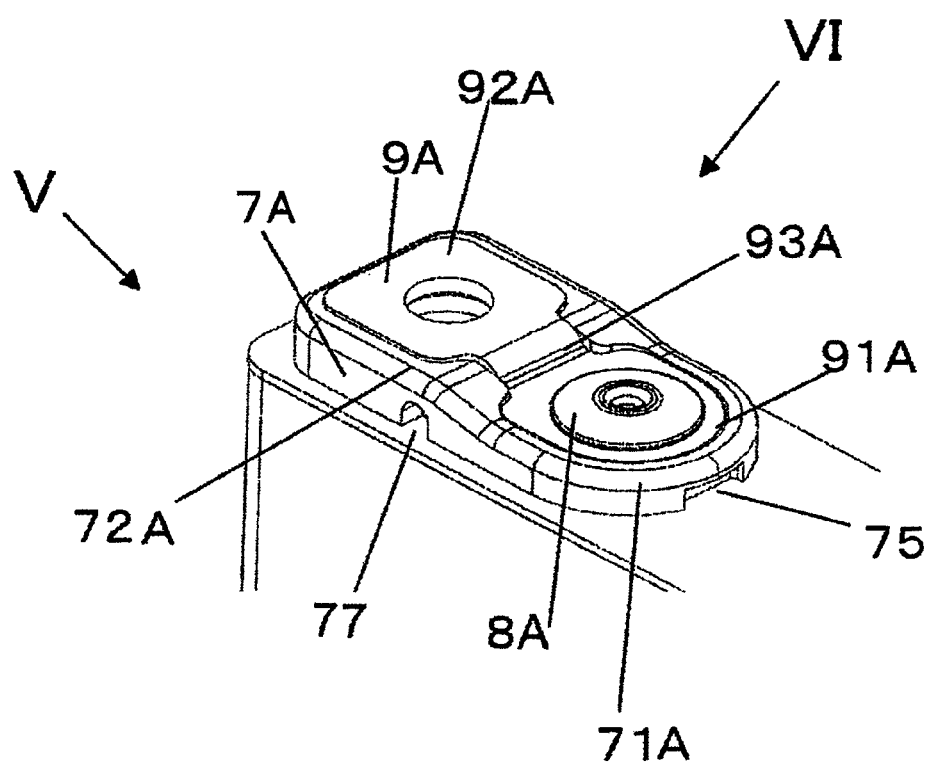
FIG. 4 is an enlarged view illustrating an IV portion in FIG. 3.
Figure 5:
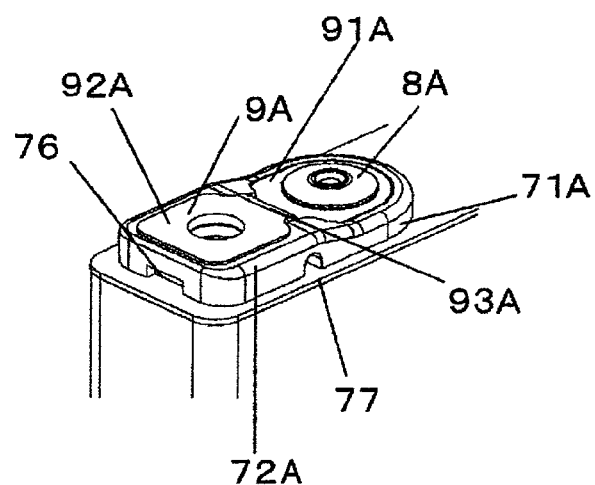
FIG. 5 is a view taken in a direction of an arrow V in FIG. 4.
Figure 6:
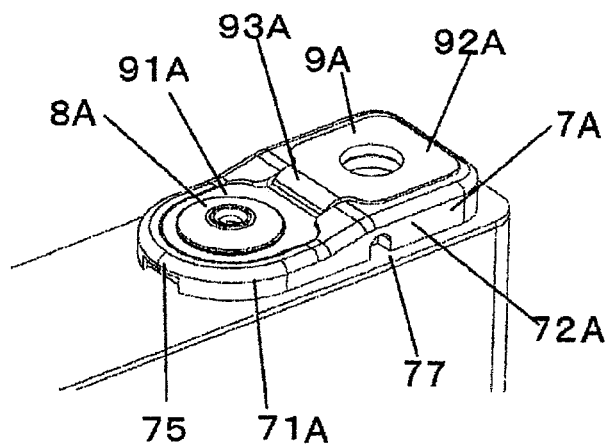
FIG. 6 is a view taken in a direction of an arrow VI in FIG. 4.
Figure 7:
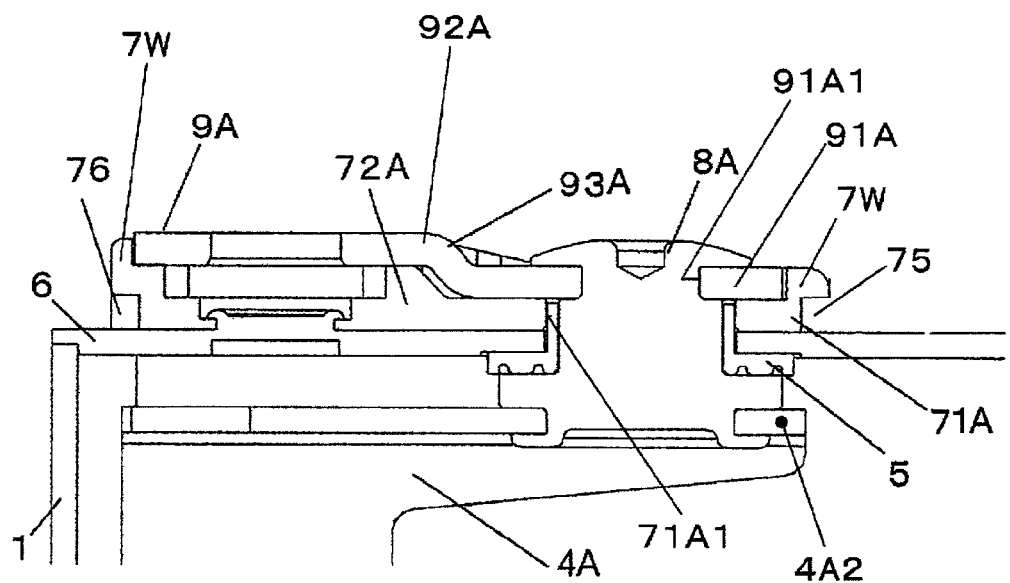
FIG. 7 is a longitudinal cross-sectional view of a positive external terminal side.

A structure in a periphery of the positive and negative external terminals will be described with an example of the positive external terminal with reference to FIGS. 2 to 7. FIG. 3 is a diagram of the upper surface of the cover 6 when viewed obliquely from above of the battery, FIG. 4 is an enlarged diagram illustrating a main portion in the periphery of the positive external terminal of FIG. 3, FIG. 5 is a diagram viewed from a direction V in FIG. 4, and FIG. 6 is a diagram viewed from a direction VI in FIG. 4. Also, FIG. 7 is a longitudinal cross-sectional view of a positive and negative external terminal peripheral structure, which is particularly a diagram illustrating a caulking structure of the positive and negative connection members 8A, 8B, and the positive and negative external terminals 9A, 9B on the upper surface of the cover 6 in detail.

(External Terminal Peripheral Structure)

The positive external terminal 9A is a metal plate formed into a substantially plate shape. The positive external terminal 9A includes a caulk-fixed portion 91A to which the positive connection member 8A is caulked and coupled, and a bus bar fitting portion 92A to which a bas bar (not shown) for connection to an external load is fitted. The caulk-fixed portion 91A and the bus bar fitting portion 92A are connected to each other by a connection plate 93A that is sloped downward toward a battery center, and formed with a narrow width.

The positive terminal insulating member 7A which is an insulating plate formed into the substantially plate shape includes a first support base 71A on which the caulk-fixed portion 91A is placed, and a second support base 72A on which the bus bar fitting portion 92A is placed. A periphery of the first support base 71A and the second support base 72A is surrounded by a wall 7W, and the positive external terminal 9A is positioned in an area surrounded by the wall 7W. A through-hole 71A1 is formed in the first support base 71A of the positive terminal insulating member 7A, and a through-hole 91A1 is formed in the caulk-fixed portion 91A. Similar holes are formed in the cover 6 in correspondence with those through-holes. The columnar positive connection member 8A penetrates through those through-holes, and upper and lower ends of the positive connection member 8A extend to an interior and an exterior of the battery container, respectively. The lower end of the positive connection member 8A is fixed to the positive current collector 4A by caulking, and the upper end thereof is fixed to the caulk-fixed portion 91A of the positive external terminal 9A by caulking. The terminal insulating member 7A is nipped between the cover 6 and the positive external terminal 9A by caulking fixation.

(Terminal Insulating Member)

As described above, the terminal insulating member 7A has the first support base 71A and the second support base 72A, and is formed into an oval shape having a width slightly smaller than a thickness of the battery container. A leading end of the first support base 71A is formed into an arcuate shape, and the second support base 72A is formed into a substantially square shape as a whole. An engagement recess 75 having a recessed rectangular cross-sectional shape is formed on a side surface of the arcuate leading end of the first support base 71A, an engagement recess 76 having a recessed rectangular cross-sectional shape is formed on a side surface of the second support base 72A facing the engagement recess 75. Further, each engagement 77 having a recessed circular cross-sectional shape is formed substantially in the center of both side surfaces of the terminal insulating member 7A in a width direction of the battery container.

The negative external terminal 9B is the same part as that of the positive external terminal 9A, and the negative terminal insulating member 7B is the same part as that of the positive terminal insulating member 7A, and therefore their description will be omitted.

Thus, the engagement recesses 75 to 77 are formed on four peripheral surfaces of the terminal insulating member 7A formed into the planar oval shape, and used for positioning and fixing the accessories (later-fitted parts) which are fitted to the secondary battery SB later. Hereinafter, the accessories will be described.

[External Part Applied Example (No. 1): Gas Repair Duct]

As described above, in the secondary battery SB, when an internal pressure within the battery container exceeds a given value, a gas is discharged from the gas discharge valve 10 to the external. Under the circumstance, a gas collection duct that guides the discharged gas up to an appropriate place is used so that the discharged gas does not scatter to the periphery of the secondary battery SB. An applied example in which the gas collection duct is easily loaded into the positive and negative terminal insulating members 7A and 7B will be described with reference to FIGS. 8 to 12.

Figure 8:
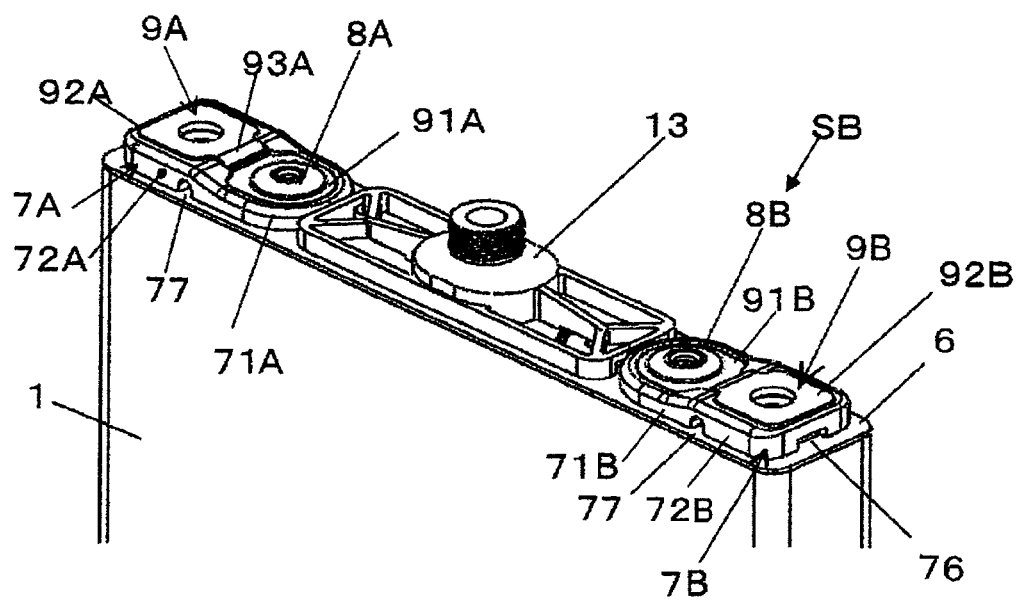
FIG. 8 is an enlarged perspective view illustrating a state in which a gas collection duct is loaded into the secondary battery of FIG. 1.
Figure 9:
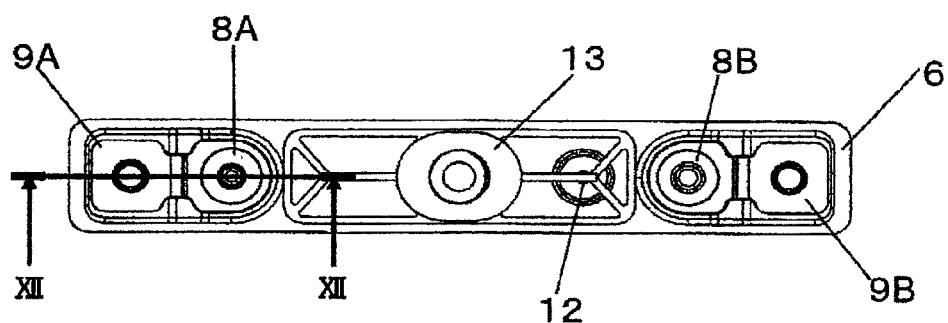
FIG. 9 is a plan view of FIG. 8.

As illustrated in FIGS. 8 and 9, a gas collection duct 13 is loaded on the upper surface of the cover with the use of the engagement recesses 76 disposed on facing surfaces of the first and second support bases 71A and 71B of the positive and negative terminal insulating members 7A and 7B.

Figure 10:
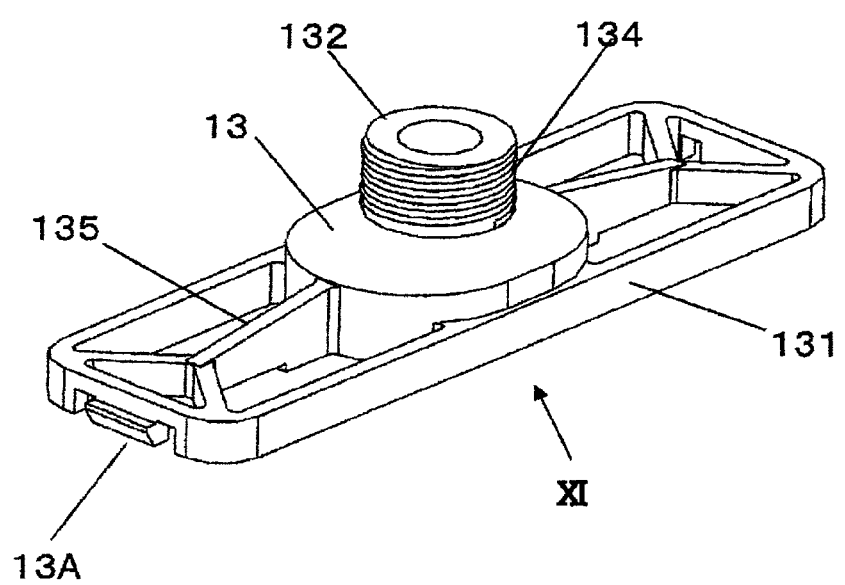
FIG. 10 is a perspective view illustrating the gas collection duct of FIG. 8.
Figure 11:
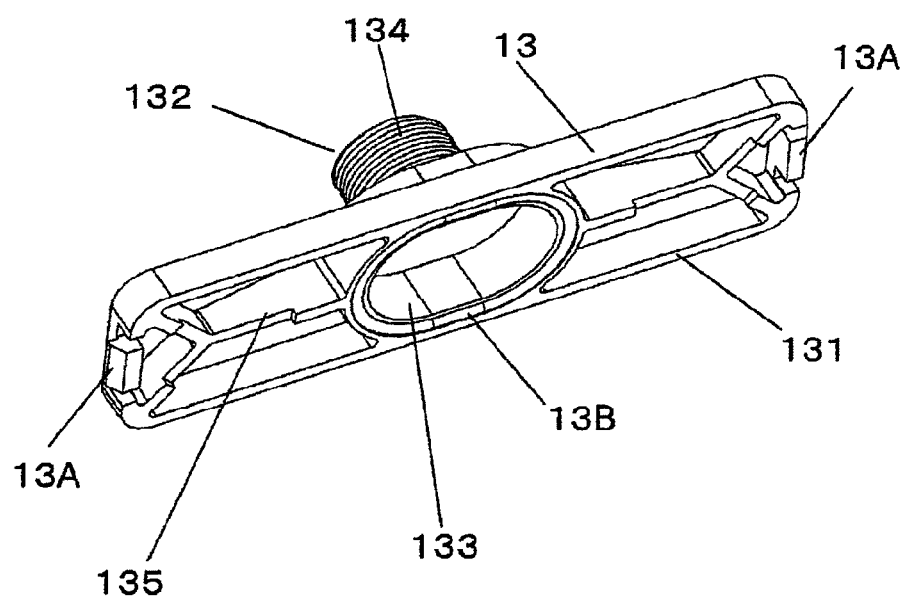
FIG. 11 is a view taken in a direction of an arrow XI in FIG. 10.

As illustrated in FIGS. 10 and 11, the gas collection duct 13 has a base 131 formed into a substantially rectangular shape. The base 131 has substantially the same width as the width of the cover 6, a length slightly shorter than an interval between the facing surfaces of the first support bases 71A and 71B of both the terminal insulating members 7A and 7B, and substantially the same thickness (height) as that of the first support bases 71A and 71B. Accordingly, the base 131 is fittedly housed between both the terminal insulating members 7A and 7B so as to be continuous to the first and second support bases 71A and 71B.

The gas collection duct 13 is molded with, for example, a synthetic resin, and the base 131 is formed into a hollow shape reinforced by ribs 135.

Both ends of the base 131 in the longitudinal direction are each provided with a claw 13A that is engaged with the engagement recess 76, and elastically deformable in the longitudinal direction of the base 131. Each claw 13A is slightly protruded from an end surface of the base 131. An outlet 132 from which the gas is discharged is protruded upward from the center of the base 131 in the longitudinal direction. An external thread 134 is formed on an outer periphery of the outlet 132. A gas discharge pipe (not shown) and a gas discharge hose (not shown) can be attached to the outlet 132 with the use of the external thread 134.

A gas collection chamber 133 that communicates with the outlet 132 is disposed in the base 131. An O-ring 13B is loaded into an O-ring loading groove which is formed to surround the gas collection chamber 133 on a bottom surface of the base 131. The gas collection duct 13 is attached firmly to an outlet side of the gas discharge valve 10 with the use of the O-ring 13B, and air-tightly arranged.

A method of loading the gas collection duct 13 will be described.

Figure 12:
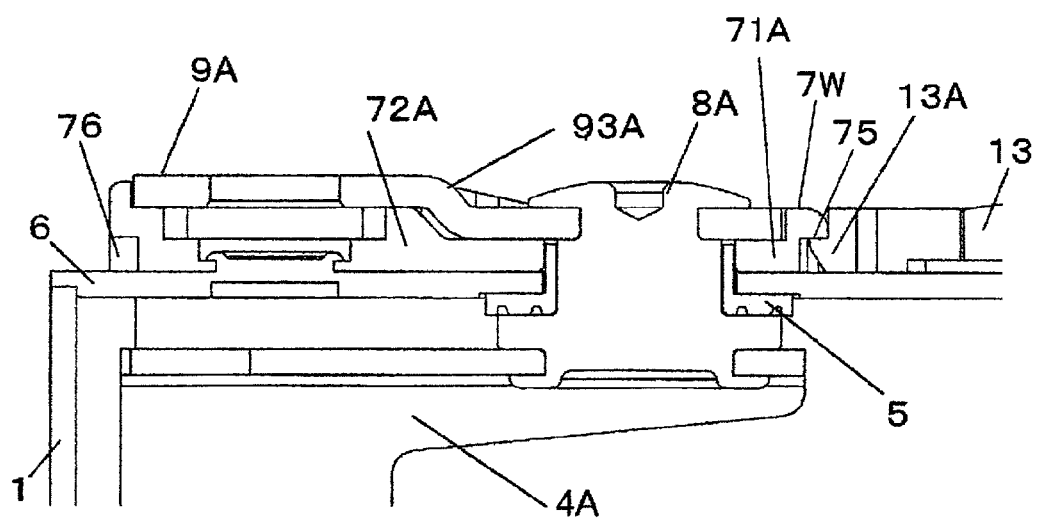
FIG. 12 is a cross-sectional view taken along a line XII-XII of FIG. 9.

The gas collection duct 13 in which the O-ring 13B is loaded into the O-ring loading groove of the bottom surface of the base is pushed toward an area between the positive and negative terminal insulating members 7A and 7B from above of the cover 6. Each claw 13A of the gas collection duct 13 is slightly protruded from an end surface of the base 131. When the base 131 is pushed toward the area between both the terminal insulating members 7A and 7B from above, as illustrated in FIG. 12, each claw 13A is pushed into the inside once while coming in contact with each of the inner surfaces of the first support bases 71A and 71B. Thereafter, each claw 13A is elastically protruded within the engagement recess 75, and engaged therewith. In this situation, the O-ring 13B loaded into the O-ring loading groove is appropriately pressed and deformed, and the gas collection chamber 133 is air-tightly firmly attached to the cover 6.

In the secondary battery having the gas collection duct 13 loaded in this way, the gas that is discharged from the gas discharge valve 10 when an internal pressure of the secondary battery SB exceeds a threshold value is discharged from the outlet 132 while being collected into the gas collection chamber 133. Then, the gas is discharged to an appropriate place such as a vehicle exterior by a pipe or a hose which is connected to the outlet 132 of the gas collection duct 13. When the gas is discharged from the gas discharge valve 10, the O-ring 13B is appropriately deformed by a gas pressure, and the gas is prevented from being leaked from the gas collection duct 13.

According to the secondary battery having the gas collection duct 13 loaded therein as described above, the following advantages can be obtained.

(1) The gas collection duct 13 can be supported and fixed by the engagement recess 75 of the terminal insulating members 7A and 7B without using a particular fitting part. Accordingly, a member only for fitting the gas collection duct becomes unnecessary, and the costs can be reduced.

(2) The dimension of the gas collection duct 13 in the longitudinal direction is made substantially the same as a spaced distance between the positive and negative terminal insulating members 7A and 7B face each other; and the dimension in the transverse direction is made slightly smaller than the dimension in the thickness direction of the battery. That is, a shape of the gas collection duct 13 in a plan view falls within contour dimensions of the cover. As a result, even if the gas collection duct 13 is loaded in the secondary battery, the sizes of the secondary battery SB in the thickness direction (transverse direction) and the width direction (longitudinal direction) do not become large.

[External Part Applied Example (No. 2): Radiation Function Part]

An applied example in which the radiation function part is loaded with the use of the engagement recess will be described with reference to FIGS. 13 to 17.

Since the secondary battery SB generates heat by charging and discharging the power generation body 3, the radiation function part may be load for cooling the secondary battery SB as occasion demands. Under the circumstance, an applied example in which a radiation function part 14 is easily loaded into each of the positive and negative terminal insulating members 7A and 7B will be described with reference to FIGS. 13 to 17.

Figure 13:
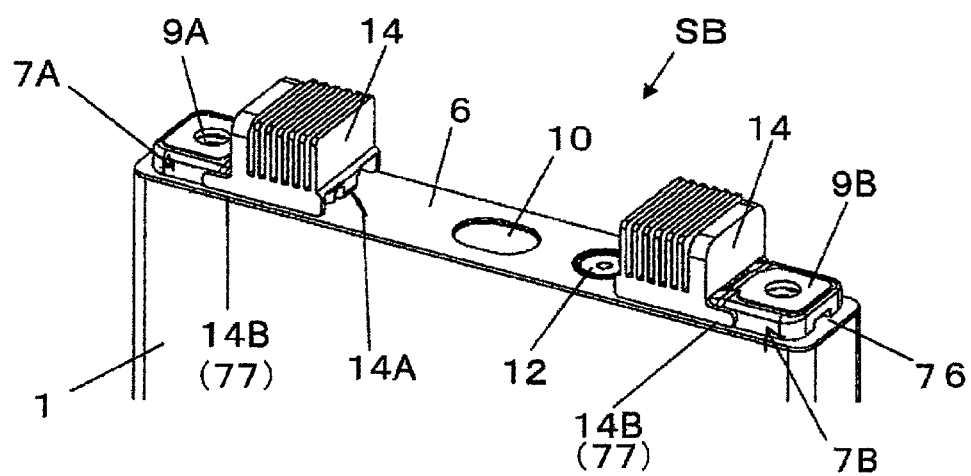
FIG. 13 is an enlarged perspective view illustrating a state in which a radiation function part is loaded into the secondary battery of FIG. 1.
Figure 14:
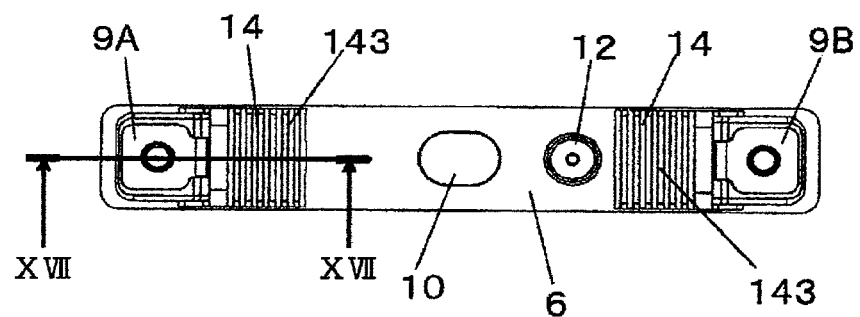
FIG. 14 is a plan view of FIG. 13.
Figure 17:
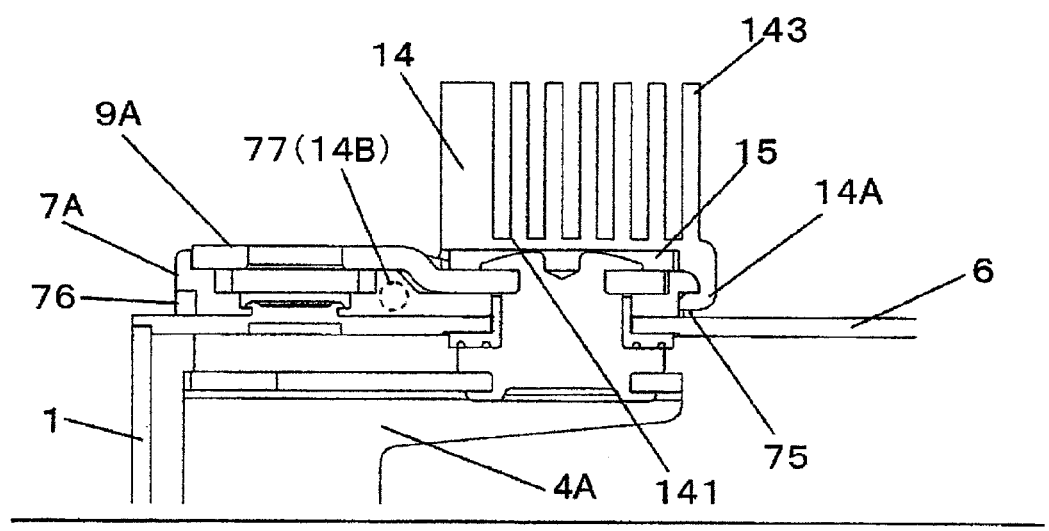
FIG. 17 is a cross-sectional view taken along a line XVII-XVII of FIG. 14.

As illustrated in FIGS. 13 and 14, the radiation function part 14 is loaded into each of the first and second support bases 71A and 71B of the positive and negative terminal insulating members 7A and 7B. As illustrated in FIG. 17, a heat transfer sheet 15 is interposed between the radiation function part 14, and each of the caulking member 8A and the positive external terminal 9A, and a heat of the power generation body 3 is effectively transferred to the radiation function part 14 from the caulking member 8A and the positive external terminal 9A. The heat transfer sheet 15 can be molded with a soft material such as silicon or rubber which is soft, and has an adhesion, an elastic performance, and a heat transfer performance.

The radiation function parts 14 loaded into the positive and negative terminal insulating members 7A and 7B are identical with each other, and the positive and negative terminal insulating members 7A and 7B are identical with each other. Hereinafter, the positive terminal insulating member 7A side will be mainly described.

Figure 15:
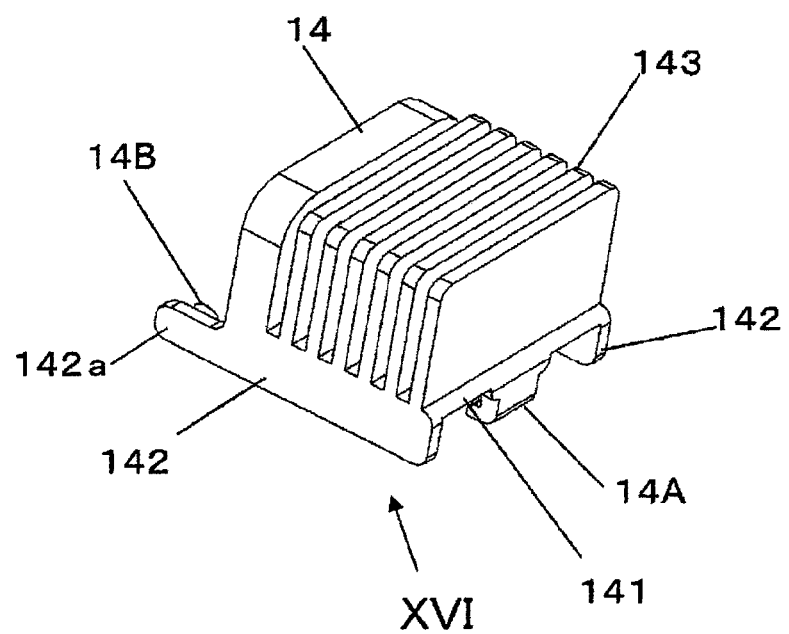
FIG. 15 is a perspective view illustrating the radiation function part in FIG. 13.
Figure 16:
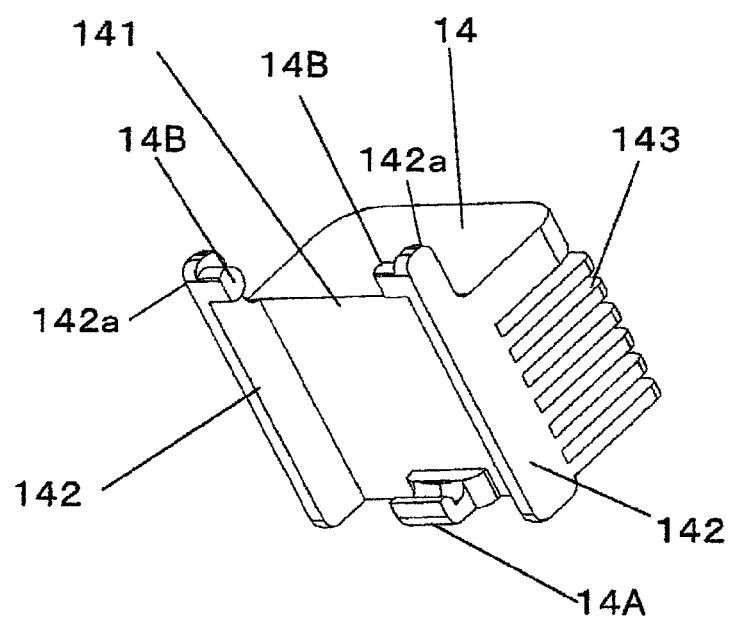
FIG. 16 is a view taken in a direction of an arrow XVII in FIG. 16.

As illustrated in FIGS. 15 and 16, each radiation function part 14 is formed into a substantially cubic shape having substantially the same thickness as the thickness of the battery container. The radiation function part 14 includes a plate-like base 141 that is abutted against an upper surface of the first support base 71A, a plurality of fins 143 erected on an upper surface of the base 141 at given intervals, and a pair of clamping plates 142 extended on both side ends of a lower surface of the base 141 along side surfaces of the first support base 71A. The pair of clamping plates 142 have a pair of overhanging portions 142a protruded from the base 141, and bosses 14B that are fitted into the pair of the engagement recesses 77 of the first support base 71A are protruded from the respective facing surfaces of those overhanging portions 142a. The pair of overhanging portions 142a can be elastically deformed in an enlargement/contraction direction of the interval therebetween.

A claw 14A which is engaged with the engagement recess 76 of the first support base 71A is protruded downward from a center of a lower surface edge on a side opposite to the overhanging portions 142a of the base 141. An engagement portion bent inward of the base 141 is formed on a leading end of the claw 14A. As illustrated in FIG. 14, the claw 14A and the bosses 14B are positionally set so that the base 141 comes close to the external terminal 9A and the caulking member 8A in a state where the radiation function part 14 is fitted to the terminal insulating member 7A.

As will be described later, when the radiation function part 14 is loaded across the insulating terminal member 7A, the claw 14A is elastically deformed and engaged with the engagement recess 76, and the pair of bosses 14B are engaged with the engagement recesses 77 by allowing the overhanging portions 142a of the clamping plates 142 to be elastically deformed toward the outside.

A method of loading the radiation function part 14 will be described.

As illustrated in FIG. 17, the heat transfer sheet 15 is laid on an upper surface of the connection member 8A in advance. The radiation function part 14 is slid toward the outside in the longitudinal direction of the battery container along both side surfaces of the first support base 71A while the overhanging portions 142a of the clamping plates 142 are elastically deformed outward so as to be pushed and opened. When the bosses 14B reach the respective positions of the engagement recesses 77, the overhanging portions 142a are restored and deformed, and the bosses 14B are engaged with the engagement recesses 77. As a result, the radiation function part 14 is pivotally supported by the engagement recesses 77 in the bosses 14B, and freely swingable about the engagement recesses 77. The radiation function part 14 is rotated about the engagement recesses 77 toward the cover 6, and the claw 14A is engaged with the engagement recess 76.

In the secondary battery SB having the radiation function parts 14 loaded in this way, the heat of the positive and negative external terminals 9A and 9B, which has been transferred from the power generation body 3 is transmitted to the radiation function parts 14 through the heat transfer sheet 15. The heat is further transmitted to the fins 143 rapidly, and radiated. As a result, the heat of the positive external terminal 9A is efficiently radiated, the secondary battery SB is prevented from being overheated whereby the performance of the secondary battery SB can be prevented from being deteriorated, and the lifetime can be lengthened.

According to the secondary battery having the radiation function part 14 loaded therein as described above, the following advantages can be obtained.

(1) The radiation function part 14 can be supported and fixed to each of the terminal insulating members 7A and 7B by the engagement recesses 76 and 77 without using a particular fitting part. Accordingly, a member only for fitting the radiation function part becomes unnecessary, and the costs can be reduced.

(2) Like the gas collection duct 13, a shape of the radiation function part 14 in a plan view falls within contour dimensions of the cover. As a result, even if the radiation function part 14 is loaded in the secondary battery, the sizes of the secondary battery SB in the thickness direction (transverse direction) and the width direction (longitudinal direction) do not become large.

(3) The work of fitting the radiation function parts 14 to the terminal insulating members 7A and 7B is extremely easy.

(4) The heat transfer sheet 15 is interposed between heads of the positive and negative connection members 8A and 8B, and the positive and negative external terminals 9A and 9B, to which the heat of the power generation body 3 is transferred from the positive and negative current collectors 4A and 4B. As a result, the heat of the power generation body 3 is efficiently transferred to the positive and negative external terminals 9A and 9B so that the secondary battery can be efficiently cooled.

(5) The heat transfer sheet 15, which is molded with a soft material such as silicon or rubber which is soft, and has an adhesion, an elastic performance, and a heat transfer performance, is interposed between the heads of the positive and negative connection members 8A and 8B, and the positive and negative external terminals 9A and 9B. As a result, an elastic repulsive force is generated between the radiation function part 14 and the connection terminal 9A by the elastic performance, to absorb gaps between the claw 14A of the radiation function part 14, and the engagement recesses 76 and 77 of the terminal insulating member 7A. As a result, backlash between the parts is absorbed, and the radiation function part 14 can be stably loaded onto an upper portion of the connection terminal 9A of the secondary battery SB.

In fitting the radiation function part 14 onto the terminal insulating member 7A, the claw 14A may be engaged with the engagement recess 76 while the bosses 14B are fitted into the engagement recesses 77.

[External Part Applied Example (No. 3)]

A description will be given of an applied example in which when a plurality of the secondary batteries SB are configured as an assembled battery by a cell holder, the cell holder is loaded with the use of the engagement recesses of the terminal insulating members 7A and 7B with reference to FIGS. 18 to 23. The cell holders are used for positioning the plurality of secondary batteries SB.

Figure 18:
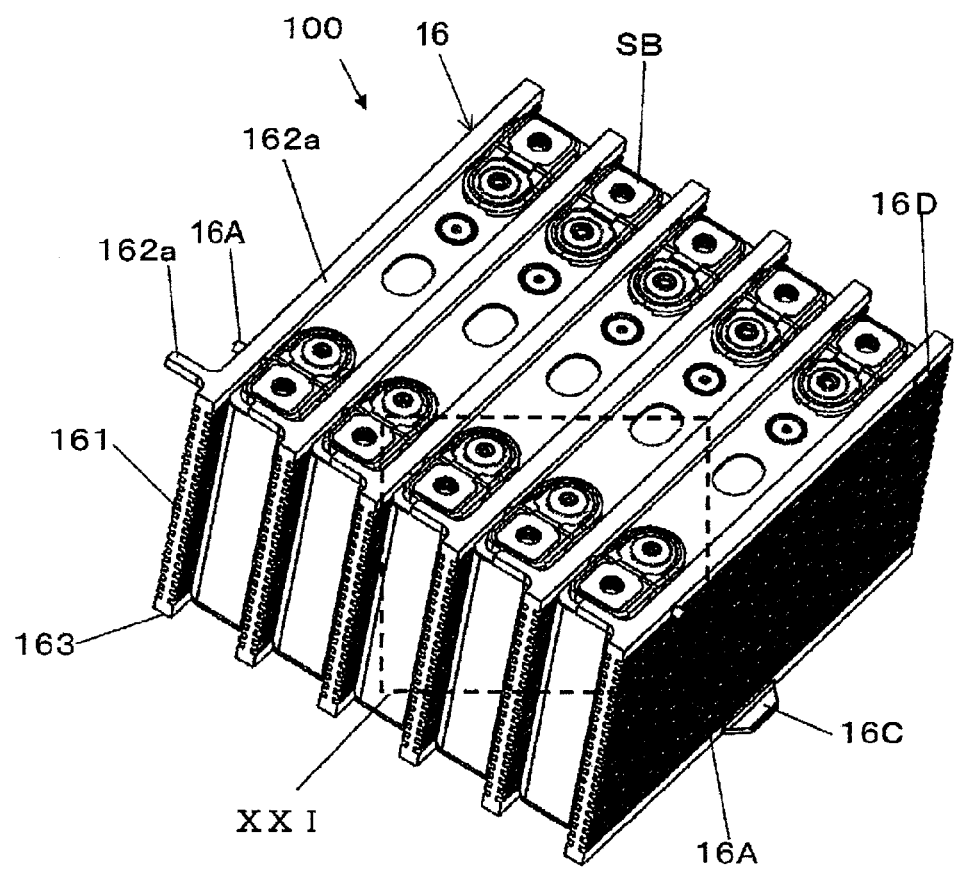
FIG. 18 is a perspective view illustrating an assembled battery configured by the secondary battery in FIG. 1.

An assembled battery 100 illustrated in FIG. 18 is assembled in such a manner that the plurality of secondary batteries SB are arranged in parallel in a thickness direction thereof, and cell holders 16 are inserted between the adjacent secondary batteries SB.

An assembled battery integral structure using the cell holders 16 will be described with reference to FIGS. 19 to 23.

Figure 19:
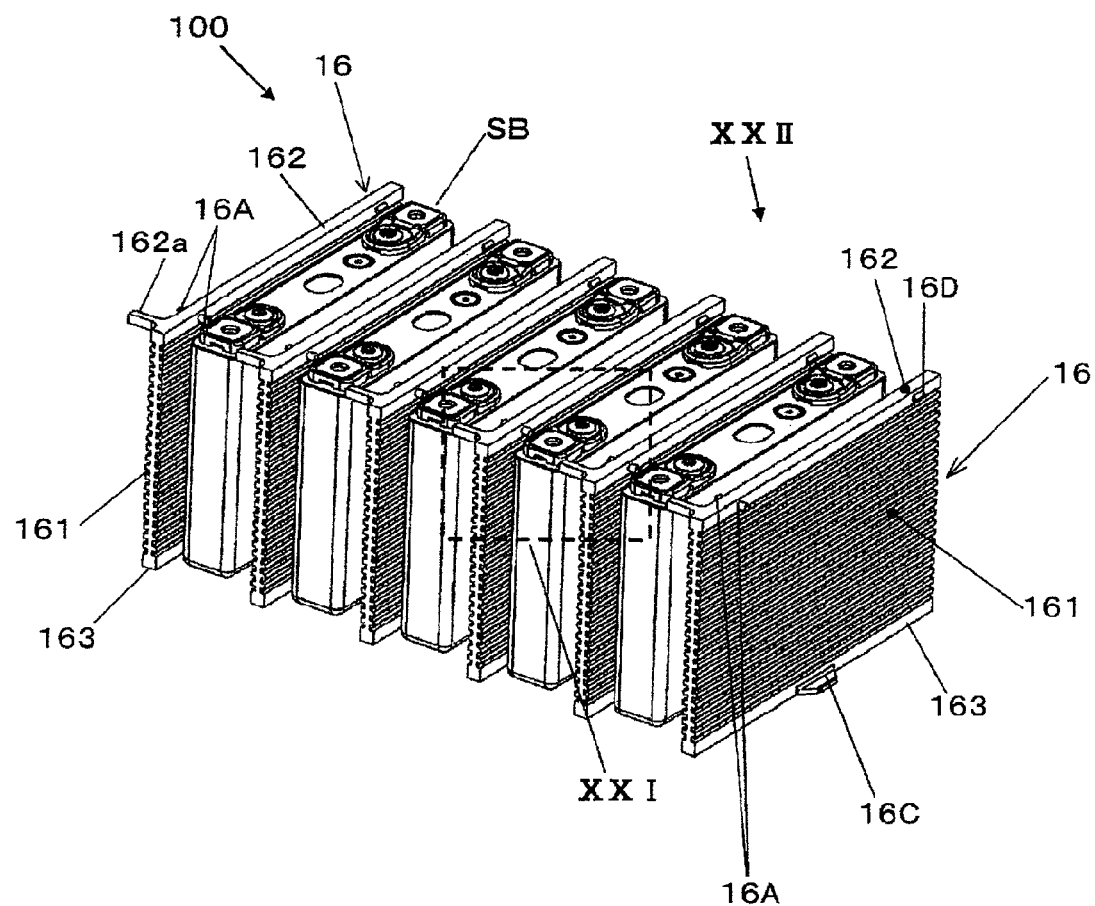
FIG. 19 is an exploded perspective view of the assembled battery in FIG. 18 when viewed from the same direction.
Figure 20:
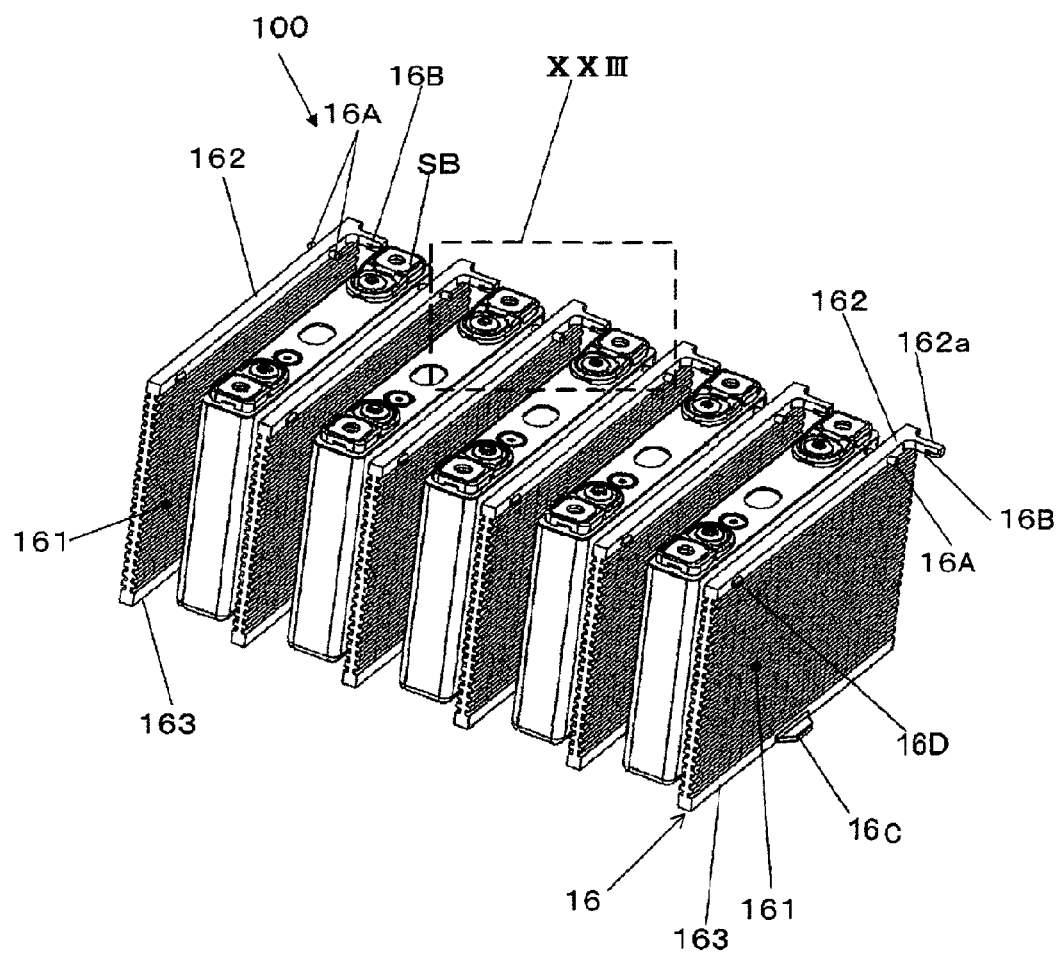
FIG. 20 is an exploded perspective view of the assembled battery in FIG. 18 when viewed from the opposite direction.
Figure 21:
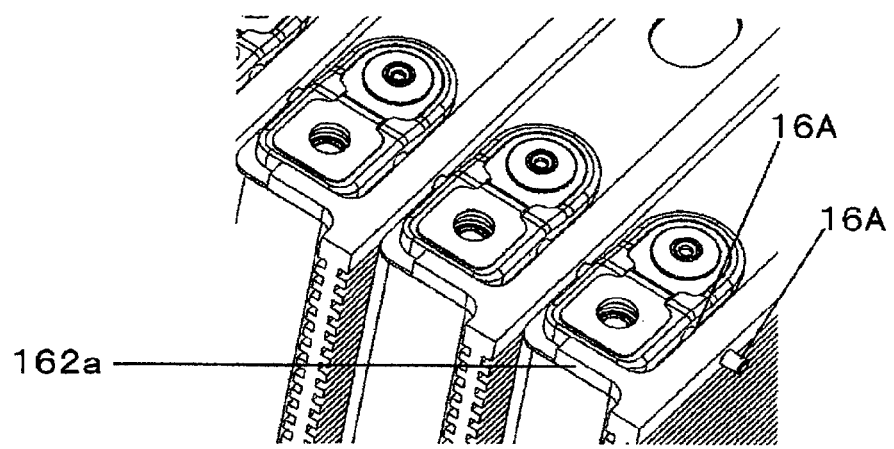
FIG. 21 is an enlarged view illustrating an XXI portion in FIG. 18.
Figure 22:
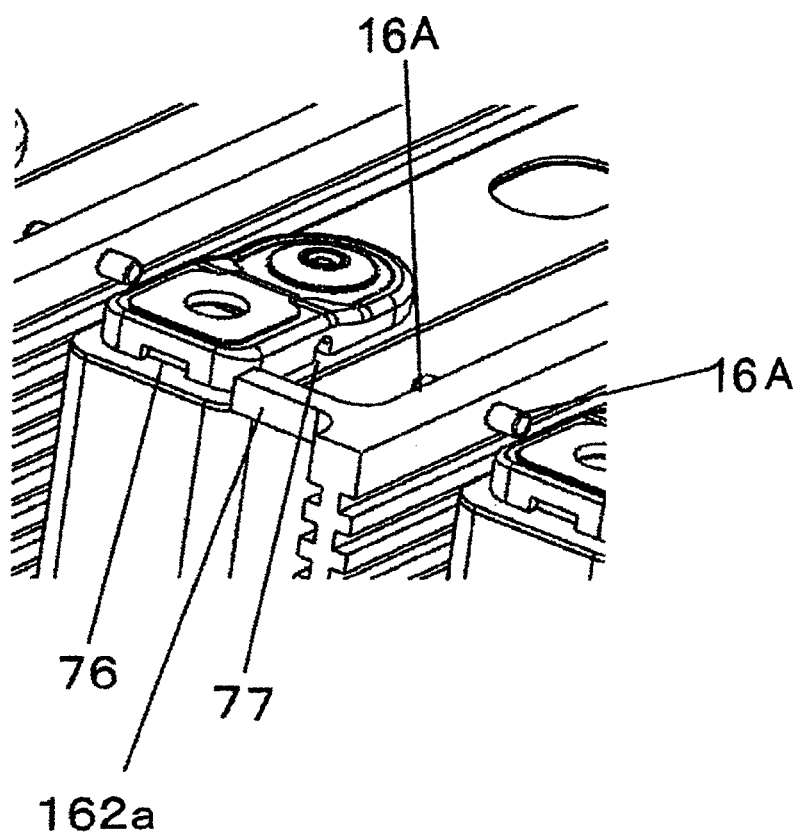
FIG. 22 is an enlarged view illustrating an XXII portion in FIG. 19.
Figure 23:
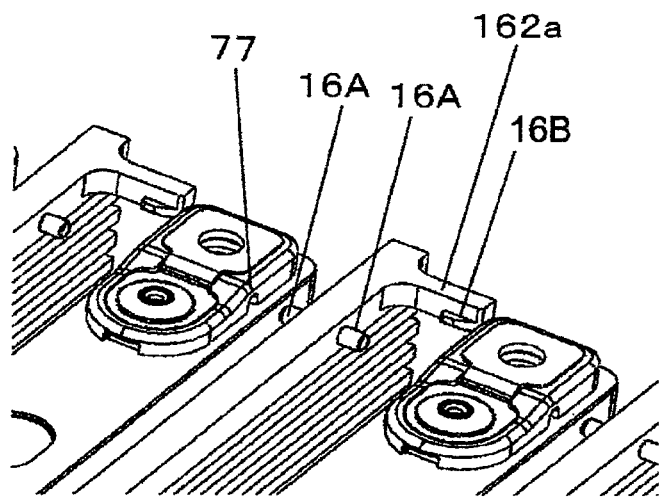
FIG. 23 is an enlarged view illustrating an XXIII portion in FIG. 20.

FIG. 19 is an exploded perspective view of the assembled battery illustrated in FIG. 18 when viewed from the same direction, which is a diagram illustrating the secondary batteries SB and the cell holders 16 which are separated from each other. FIG. 20 is an exploded perspective view of the assembled battery illustrated in FIG. 18 when viewed from the opposite direction, which is a diagram illustrating the secondary batteries SB and the cell holders 16 which are separated from each other.

The cell holders 16 will be described with reference to FIGS. 18 to 20.

Each of the cell holders 16 is formed into a rectangular plate shape slightly larger than a largest surface of the secondary battery SB, and made of an insulating synthetic resin. Each of the cell holders 16 includes a main plate 161 arranged to face the largest surface of the secondary battery, an upper edge member 162 extending along an upper edge of the secondary battery SB, and a lower edge member 163 extending along a lower edge of the secondary battery SB. Air passages are formed in front and rear surfaces of the main plate 160 in a horizontal direction at given intervals. The main plate 161 is interposed between the upper and lower edge members 162 and 163. A retainer member 162a having the substantially same length as the thickness of the secondary battery SB in the thickness direction of the secondary battery SB is protruded at a right angle from one end of the upper edge member 162. Bosses 16A, which are engaged with the engagement recesses 77, are protruded from front and rear surfaces of an end side close to the retainer member 162a of the upper edge member 162. Also, a claw 16B, which is engaged with the engagement recess 76, is protruded from an inner surface of the retainer member 162a.

A placement protrusion 16C on which the bottom surface of the secondary battery SB is placed is protruded from one surface of a center portion of the lower edge member 163, and a retainer protrusion 16D formed into a prismatic shape is protruded from one surface of an end side closer to a side opposite to the retainer member 162a of the upper edge member 162. The placement protrusion 16C and the retainer protrusion 16D prevent the inclination of the adjacent secondary batteries.

A procedure of assembling the assembled battery will be described.

In the following procedure, the cell holder 16 is loaded on one largest surface of all the secondary batteries SB which are to be formed into the assembled battery. One of the pair of bosses 16A of the upper edge member 162 of the cell holder 16 is engaged with the engagement recess 77 of the terminal insulating member 7A of the secondary battery SB, and the claw 16B of the retainer member 162a of the upper edge member 162 is locked by the engagement recess 76 of the terminal insulating member 7A to load the cell holder 16 in the secondary battery SB.

The plurality of secondary batteries SB on which the cell holders 16 are loaded are sequentially integrated in the thickness direction in the following procedure to assemble the assembled battery. The main plate 161 of the cell holder 16 loaded on the secondary battery SB is arranged in close contact with the largest surface of the secondary battery SB adjacently arranged. In this situation, the bottom surface of the secondary battery SB is placed on the placement protrusion 16C, and the retainer protrusion 16D is locked to an edge of the upper surface of the cover 6 of the secondary battery SB.

The above procedure is repetitively conducted on all of the secondary batteries SB to be formed into the assembled battery, thereby being capable of fabricating the assembled battery illustrated in FIG. 18.

The assembled battery thus fabricated obtains the following advantages.

(1) Since a plurality of electric cells are assembled as the assembled battery with the use of the cell holders 16 loaded in the terminal insulating members 7A and 7B, the number of parts can be reduced without need to use a particular part for loading the cell holders 16 into the secondary batteries SB.

(2) The bosses 16A protruded toward the largest surface side of the secondary battery SB, and the claw 16B protruded toward the smallest surface side are engaged with the engagement recesses 76 and 77 to load the cell holder 16 into the terminal insulating members 7A and 7B. Since the cell holder 16 is loaded in the secondary battery SB in two directions, a risk that the cell holder 16 loaded in the secondary battery SB drops off is lower than a case in which the cell holder 16 is loaded in the secondary battery SB by only the bosses 16A protruded toward the largest surface side of the secondary battery SB.

(3) Since the adjacent secondary batteries SB are mutually held by the placement protrusion 16C and the retainer protrusion 16D of the cell holders 16, an inclination within a plane parallel to the largest surface of the secondary battery SB is prevented.

(4) In assembling the assembled battery 100, the cell holders 16 can be loaded in the secondary batteries SB in advance, and the efficiency of the assembling work is high.

The secondary battery SB according to the present invention can be implemented with the following modifications.

(1) The same positive and negative terminal insulating members are used, and the two insulating members are used together to load the accessories. Alternatively, the positive and negative terminal insulating members may be configured by different members.

(2) A case in which the external parts are loaded in the pair of positive and negative terminal insulating members has been described. Alternatively, the external parts may be loaded in only any one of those insulating members.

(3) The engagement recesses are provided in the terminal insulating members, and the protrusions or the claws are provided on the external part. Alternately, the protrusions or the claws may be provided in the terminal insulating members, and the protrusions or the claws may be provided in the engagement recesses.

(4) The terminal insulating members are configured so that plural kinds of external parts can be loaded therein. Alternatively, only one kind of external part may be configured to be loaded in the terminal insulating members.

The secondary battery SB according to the present invention is configured to load the battery accessories in the secondary battery with the use of the insulating member that isolates the external terminal from the cover, and the present invention is not limited to the above embodiment, but includes the following configurations.

(1) The shape and the formation position of the engagement recesses formed in the terminal insulating members are not limited to the embodiment.

(2) The accessories are not also limited to the embodiment, but the present invention can be applied to a variety of external parts.

(3) The power generation body and the external terminal are electrically connected to each other by the current collector. Alternatively, the external terminal and the current collector may be integrated together, that is, formed into one member.

(4) The configuration of the power generation body is also not limited to the embodiment.

(5) The shape of the battery container is not also limited to the embodiment.

(6) The external terminal is disposed in the battery cover of the battery container. Alternatively, the present invention can be also applied to the secondary battery having the external terminal disposed on the largest surface.

The invention claimed is:

1. A secondary battery, comprising:
a power generation body that is housed within a battery container sealed with a cover;
positive and negative external terminals that are disposed on the cover and connected to the power generation body through the positive and negative power collection members, respectively; and
a pair of terminal insulating members that isolate the respective positive and negative external terminals from the cover,
wherein at least one of the pair of terminal insulating members is formed with a fitting portion for loading an external part into a battery container;
a gas collection duct provided in the cover as the external part so as to cover a gas exhaust valve disposed in the cover, in which the fitting portion is an engaging portion,
wherein the gas collection duct is provided with a locking portion that is elastically engaged with the engaging portion and locked by a terminal insulating member,
wherein the engaging portion is provided in each of the pair of terminal insulating members,
wherein the gas collection duct is laterally disposed between the pair of terminal insulating members,
wherein the engaging portion of the terminal insulating member is a recess or protrusion provided on opposite surfaces of the pair of terminal insulating members which face each other,
wherein the locking portion of a complementary protrusion or recess that is elastically engaged with the recess or protrusion of the terminal insulating member is provided on both ends of the gas collection duct in a longitudinal direction thereof, and
wherein the external part is loaded into the battery container with a use of both of the pair of terminal insulating members.

2. The secondary battery according to claim 1,
wherein the positive and negative external terminals are connected to positive and negative plates of the power generation body through positive and negative collection plates, respectively.

3. The secondary battery according to claim 1, further comprising: a pair of radiation function parts disposed in the terminal insulating members, respectively, as the external part so as to cool the secondary battery, in which the fitting portion is an engaging portion,
wherein each of the radiation function parts is provided with a locking portion that is elastically engaged with the engaging portion disposed in the terminal insulating member and locked by the terminal insulating member.

4. The secondary battery according to claim 3,
wherein the engaging portion disposed on the terminal insulating member includes:
a first engaging portion disposed on opposite surfaces of the pair of terminal insulating members which face each other; and
second and third engaging portions disposed on both side surfaces of the terminal insulating members extending in a longitudinal direction of the battery container,
wherein each of the radiation function parts is provided with first to third locking portions that are locked by the first to third engaging portions.

5. The secondary battery according to claim 4,
wherein each of the first to third engaging portions is a recess or protrusion, and
wherein the first to third locking portions are complementary with the recess or protrusion.

6. The secondary battery according to claim 5,
wherein the first to third engaging portions are recesses, and the first to third locking portions are claws that are elastically engaged with the recesses.

7. A secondary battery, comprising:
a power generation body that is housed within a battery container sealed with a cover;
positive and negative external terminals that are disposed on the cover and connected to the power generation body through the positive and negative power collection members, respectively; and
a pair of terminal insulating members that isolate the respective positive and negative external terminals from the cover,
wherein at least one of the pair of terminal insulating members is formed with a fitting portion for loading an external part into a battery container;
further comprising: a cell holder loaded into the terminal insulating members as the external part to hold the secondary battery, in which the fitting portion is an engaging portion;
wherein the cell holder is provided with a locking portion that is engaged with the engaging portion of each of the terminal insulating members with each other and elastically locked by each of the terminal insulating members;
wherein the engaging portion provided in the terminal insulating member includes first and second engaging portions disposed on both side surfaces of the terminal insulating members extending in the longitudinal direction of the battery container, and a third engaging portion disposed on a surface facing a minimum surface of the battery container, and
wherein the cell holder is provided with first and second locking portions that are locked by the first and second engaging portions, and a third locking portion that is engaged with the third engaging portion.

8. The secondary battery according to claim 7,
wherein each of the first to third engaging portions is a recess or protrusion, and
wherein the first to third locking portions are complementary with the recess or protrusion so that the cell holder is elastically loaded into the terminal insulating members.

* * * * *